J. COLLINS.
CAKE-CUTTER.
No. 176,217.  Patented April 18, 1876.
Fig: 1.
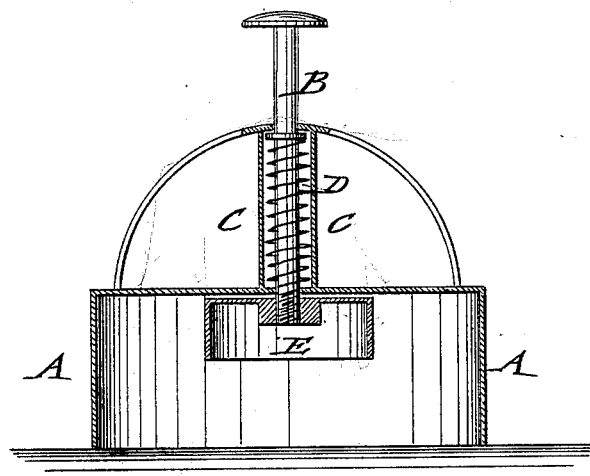
Fig: 4.  Fig: 5.
Fig: 2.
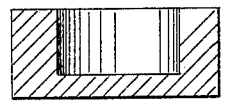
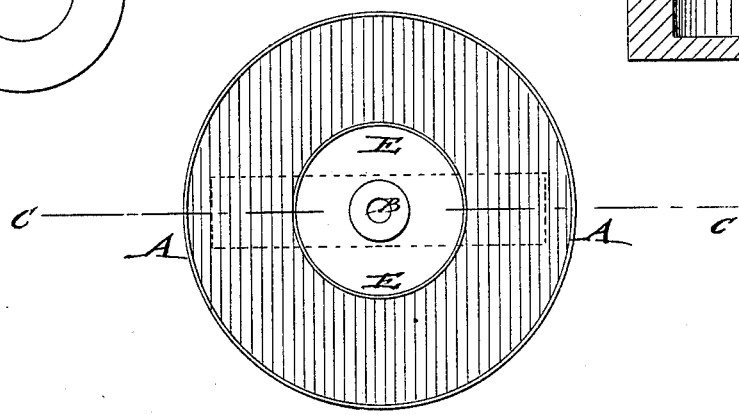
Fig: 3.
WITNESSES:  INVENTOR:
J. Collins
BY
ATTORNEYS.
N. PETERS, PHOTO-LITHOGRAPHER, WASHINGTON, D. C.

UNITED STATES PATENT OFFICE.

JAMES COLLINS, OF CENTRAL CITY, COLORADO TERRITORY.

IMPROVEMENT IN CAKE-CUTTERS.

Specification forming part of Letters Patent No. 176,217, dated April 18, 1876; application filed February 28, 1876.

*To all whom it may concern:*

Be it known that I, JAMES COLLINS, of Central City, in the county of Gilpin and Territory of Colorado, have invented a new and Improved Dough-Cutter, of which the following is a specification:

In the accompanying drawing, Figure 1 represents a vertical central section on the line *c c*, Fig. 2, of my improved dough-cutter. Fig. 2 is a bottom view of the same. Fig. 3 is a side view of the central detachable former of the same. Figs. 4 and 5 are different shapes, which may be made by the cutter.

Similar letters of reference indicate corresponding parts.

The object of my invention is to provide an improved dough-cutter, which may be employed for making tarts, doughnuts, biscuits, &c., with greater convenience and with a saving of labor and time.

The invention consists of a cutter with a central sliding and spring acting part for forming and cutting, simultaneously with the outer part, the tart or other article to be produced.

In the drawing, A represents a dough-cutter of any suitable size, material, or shape, which is provided with a central sliding bolt, B, that is guided in a suitable casing, C, at the top of the cutter A. The bolt B is acted upon by a spiral spring, D, so as to be carried in an upward direction after each depression of said spring D. The upper end of the bolt is provided with a knob, while the lower threaded end projects to the interior of the cutter and allows either the screwing on or attachment of a smaller interior cutter, E, that corresponds in shape to the outer cutter, as shown in Fig. 1, or the attaching of a solid disk or former, E', as shown in Fig. 3.

By using the outer cutter without the interior cutter, biscuits and cakes may be cut from the dough in the common manner, while doughnuts and similar articles in which the central part is to be removed, may be produced in one cutting by the simultaneous depression of the inner cutter.

When the solid former E is used in combination with the outer cutter, tarts and rimmed bakings may be formed from the dough, as the former merely presses on the central part, providing thus a simple yet very effective and convenient implement for domestic and general purposes.

Having thus described my invention, I claim as new and desire to secure by Letters Patent—

A dough-cutter for making tarts, doughnuts, biscuits, &c., composed of an outer cutter, and an interior sliding spring acted shaping device, that may be worked simultaneously with the outer cutter or not, as desired, substantially as set forth.

JAMES COLLINS.

Witnesses:
J. S. D. MANVILLE,
BEN. E. SEYMOUR.